(12) United States Patent
Baentsch et al.

(10) Patent No.: US 8,959,354 B2
(45) Date of Patent: Feb. 17, 2015

(54) METHOD, SECURE DEVICE, SYSTEM AND COMPUTER PROGRAM PRODUCT FOR DIGITALLY SIGNING A DOCUMENT

(75) Inventors: Michael Baentsch, Zurich (CH); Peter Buhler, Horgen (CH); Harold Douglas Dykeman, Richterswil (CH)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 13/074,280

(22) Filed: Mar. 29, 2011

(65) Prior Publication Data

US 2011/0247057 A1 Oct. 6, 2011

(30) Foreign Application Priority Data

Mar. 31, 2010 (EP) .................................... 10158732

(51) Int. Cl.
*G06F 21/00* (2013.01)
*G06F 21/84* (2013.01)

(52) U.S. Cl.
CPC ..................................... *G06F 21/84* (2013.01)
USPC ........ 713/176; 726/5; 726/9; 726/16; 726/21; 713/168

(58) Field of Classification Search
CPC ... G06F 21/34; G06F 21/6218; G06F 21/445; G06F 21/84; H04L 2209/76; H04L 63/0428; H04L 63/0853; H04L 9/3247; H04L 9/3273
USPC .............. 726/1–5, 9, 16–21, 26–28; 713/150, 713/168, 176
See application file for complete search history.

(56) References Cited

U.S. PATENT DOCUMENTS

| | | | |
|---|---|---|---|
| 7,539,864 B2 | 5/2009 | Labaton | |
| 7,635,084 B2 | 12/2009 | Wang | |
| 2002/0171856 A1* | 11/2002 | Ackerman et al. | ........... 358/1.13 |
| 2002/0178121 A1 | 11/2002 | Sung | |
| 2003/0131244 A1 | 7/2003 | Buoncristiani | |
| 2003/0140229 A1 | 7/2003 | Heins | |
| 2007/0167830 A1* | 7/2007 | Huang | .......................... 600/473 |

(Continued)

FOREIGN PATENT DOCUMENTS

| | | |
|---|---|---|
| EP | 0587375 B1 | 7/2003 |
| GB | 2 267986 | 12/1993 |

(Continued)

OTHER PUBLICATIONS

Weigold et al, "The Zurich Trusted Information Channel—An Efficient Defence Against Man-in-the-Middle and Malicious Software Attacks", 2008, Springer-Verlag Berlin Heidelberg, pp. 75-91.*

(Continued)

*Primary Examiner* — Joseph P Hirl
*Assistant Examiner* — John B King
(74) *Attorney, Agent, or Firm* — Tutunjian & Bitetto, P.C.; Jennifer R. Davis

(57) ABSTRACT

A method for digitally signing a document, a secure device, and a computer program product for implementing the method. The method employs a secure device which is protected against malicious software or malware and is adapted to establish a secure connection to a recipient via a host. The method includes: connecting to a terminal; accessing the contents of a document received by the secure device; instructing at the secure device to communicate the accessed contents to an output device other than the terminal such that the contents can be verified by a user; ascertaining at the secure device a command received to digitally sign the document; executing at the secure device the ascertained command; and instructing to send a digitally signed document to a recipient over a connection established via the host connected to a telecommunication network.

19 Claims, 3 Drawing Sheets

(56) References Cited

U.S. PATENT DOCUMENTS

2007/0214492 A1* 9/2007 Gopi et al. .................. 726/2
2007/0271456 A1 11/2007 Ward
2008/0301461 A1 12/2008 Coulier
2008/0307232 A1 12/2008 Pasquinelli

FOREIGN PATENT DOCUMENTS

| WO | WO 01/46785 | 6/2001 |
| WO | WO/02/091669 | 11/2002 |
| WO | WO 03/044639 | 5/2003 |

OTHER PUBLICATIONS

UBS, Access Key for Your UBS Online Services Instructions, 2010, www.UBS.com.
IBM Press Room, IBM Research Unveils "Security-on-a-Stick" to Protect Consumers and Banks from the Most Sophisticated Hacker Attcks, 2008, www.zurich.ibm.com/news/08/ztic.html.
Weigold, T., et al, The Zurich Trusted Information Channel—An Efficient Defence Against Man-in-the-Middle Malicious Software Software Attacks, Trust 2008, LNCS 4968, pp. 75-91.

* cited by examiner

METHOD, SECURE DEVICE, SYSTEM AND COMPUTER PROGRAM PRODUCT FOR DIGITALLY SIGNING A DOCUMENT

CROSS-REFERENCE TO RELATED APPLICATION

This application claims priority under 35 U.S.C.§119 from European Patent Application No. 10158732.7 filed Mar. 31, 2010, the entire contents of which are incorporated herein by reference.

BACKGROUND OF THE INVENTION

1. Technical field

The invention relates to a method of using a secure device for digitally signing a document.

2. Related art

Security problems with PCs make them unsuitable for many functions since data entered by users can be manipulated or copied by an attacker. Transactions can be changed to send money to unwanted recipients or to order unwanted goods, or user credentials can be copied providing attackers with access to systems such as those used for Internet banking.

To solve some of these problems, a user trusted device (also a "secure device") can be used together with a PC. One such solution, the IBM Zone Trusted Information Channel (see Thomas Weigold, Thorsten Kramp, Reto Hermann, Frank Höring, Peter Buhler, Michael Baentsch, "The Zurich Trusted Information Channel—An Efficient Defence against Man-in-the-Middle and Malicious Software Attacks", In P. Lipp, A.-R. Sadeghi, and K.-M. Koch (Eds.): TRUST 2008, LNCS 4968, pp. 75-91, 2008), allows the user to verify information associated with a transaction (e.g., in the case of Internet banking the amount and recipient) before the transaction is executed by the service provider (e.g., the bank). The transaction is verified on the device, which is secure and can send the verified information to the back-end system in a secure manner.

Secure digital document signing can be one of the most significant Internet applications for the future if it can be done efficiently and securely, given the potential to improve processes for businesses and private users (speed, security, efficiency).

A scheme based on a PC or similar device such as a smart phone is not secure since what the user sees on the device display and the document that is ultimately signed can be different. For instance, a malicious malware on the user's device can manipulate what is displayed so that it looks acceptable to the user. Thus, the document that is signed, either by the PC or a separate signature device, can be different, making any such scheme for digital signing of limited value.

Even if the user prints the document from the device the same problem exists: a malware can alter the document sent to the printer so that it is different than the version on the device which is be signed.

Thus, a problem with existing solutions is that a user cannot trust what is shown on the display of a device that is not secure. There is accordingly a need for improving current methods for digitally signing a document.

SUMMARY OF THE INVENTION

One aspect of the present invention provides a method for digitally signing a document, including the steps of: providing a secure device where the secure device is protected against malicious software or malware and adapted to establish a secure connection to a recipient via a host, for example a personal computer or PC, connected to a telecommunication network; after connection of the secure device to a terminal, accessing contents of a document received by the secure device from the terminal; instructing at the secure device to communicate the accessed contents to an output device distinct from the terminal, such that the contents can be verified by a user; ascertaining at the secure device a command received to digitally sign the document and executing at the secure device the ascertained command; and instructing to send a digitally signed document to a recipient over a connection established via the host, where the host is connected to a telecommunication network.

Another aspect of the present invention provides a secure device for digitally signing a document, including a memory and plurality of interfaces, where the secure device is configured to interact with a user, a terminal such as a personal computer or PC, and a recipient, and the secure device is configured to establish a secure connection such as a TLS/SSL connection with a recipient via a host when the secure device is connected to the host and the host is configured to communicate with the recipient through a telecommunication network, Preferably, the plurality of interfaces further includes a display adapted for displaying at least partly the preceding contents.

Another aspect of the present invention provides a system including: the secure device according to the invention, a personal computer or PC, and a server.

Another aspect of the present invention provides a computer readable article of manufacture tangibly embodying computer readable instructions which when executed, causes a computer to carry out the steps of a method for digitally signing a document, including the steps of: providing a secure device where the secure device is protected against malicious software or malware and adapted to establish a secure connection to a recipient via a host, for example a personal computer or PC, connected to a telecommunication network; after connection of the secure device to a terminal, accessing contents of a document received by the secure device from the terminal; instructing at the secure device to communicate the accessed contents to an output device distinct from the terminal, such that the contents can be verified by a user; ascertaining at the secure device a command received to digitally sign the document and executing at the secure device the ascertained command; and instructing to send a digitally signed document to a recipient over a connection established via the host, where the host is connected to a telecommunication network.

Methods, devices and systems embodying the present invention will now be described, by way of non-limiting examples, and in reference to the accompanying drawings.

DETAILED DESCRIPTION OF THE PREFERRED EMBODIMENTS

Figure 1:
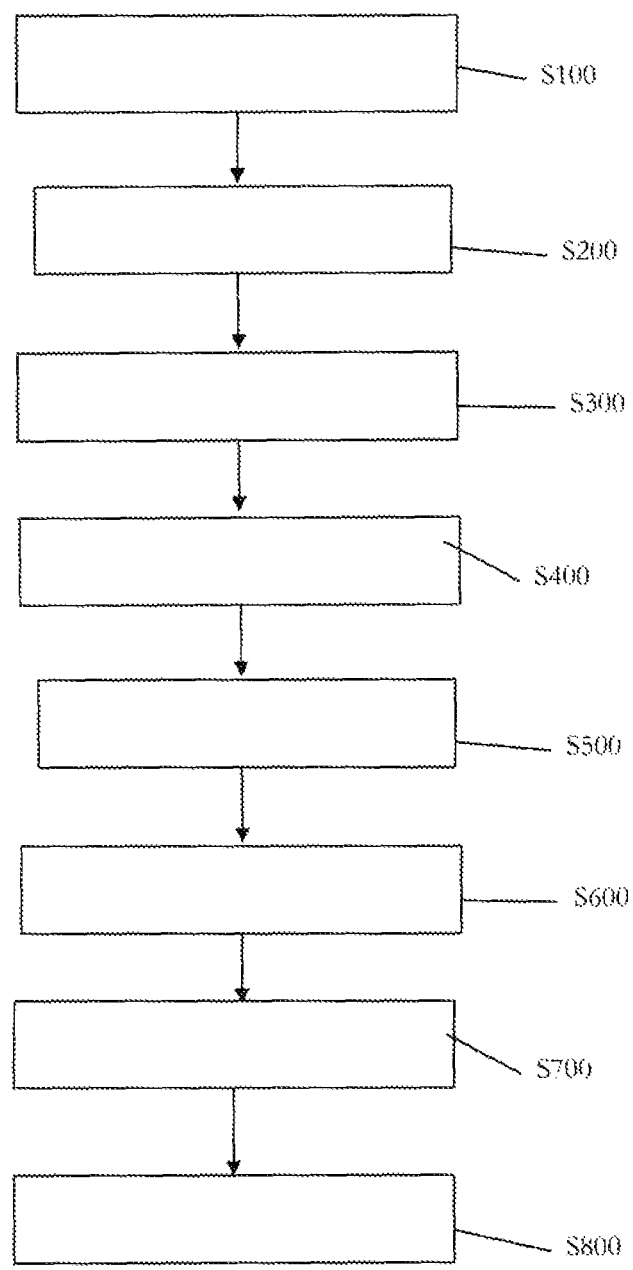
FIG. 1 is a flowchart depicting steps of a high-level embodiment of the method according to the invention.

As an introduction to the following description, it is first pointed at a general aspect of the invention, directed to a method for digitally signing a document. The method provides a secure document management and signing operations based on a secure device (also trusted device). The secure device is protected against malicious software and configured to establish a connection (e.g., a mutually authenticated connection such as a TLS/SSL connection) to a recipient/server via a terminal, e.g., a PC. This secure device can be used to securely store and manage documents received from the server or any other source. The user can subsequently visualize the document via a display thereof or an external output device, to ensure that it is correct. The user can thus have a digital signature issued directly by the secure device (or via a terminal). Accordingly, it is possible to ensure that the document signed and sent is exactly as intended by the user.

According to an embodiment of the present invention, the method may include at least one of the following features: after connecting to the host and prior to accessing the contents of the document received, a step of instructing at the secure device to establish a connection between the secure device and a server, via the host, and receiving the document through the established connection, such that the terminal acts as the host; a connection established via the host is a secure connection; at the step of ascertaining, the received command is a command inputted by the user at the secure device, and at the step of executing the ascertained command, the command executed is a command issued by the secure device and corresponding to the command inputted by the user; at the step of ascertaining, the received command is a command received via a terminal to which the secure device is connected; the recipient is the server and at the step of instructing to send the digitally signed document, it is instructed to send the digitally signed document to the server, using the same connection already established with the server; at the step of instructing to send the digitally signed document, the secure device is instructed to send the digitally signed document to a recipient distinct from a source of the document first received at the secure device; the output device is a display of the secure device and the step of instructing to communicate the contents includes instructing to display the contents on the display of the secure device; the output device is an external device and the method according to the invention further includes a step of establishing a communication between the secure device and the external device distinct from the terminal, where the step of instructing to communicate the contents includes communicating the contents to the external device; the external device is a beamer; the external device is a printer; the step of instructing to communicate the contents includes instructing to communicate the contents using secure Bluetooth pairing; the step of instructing to communicate the contents includes instructing to communicate the contents using a USB protocol; and at least one secure connection established is a mutually authenticated connection such as a TLS/SSL connection.

Figure 2:
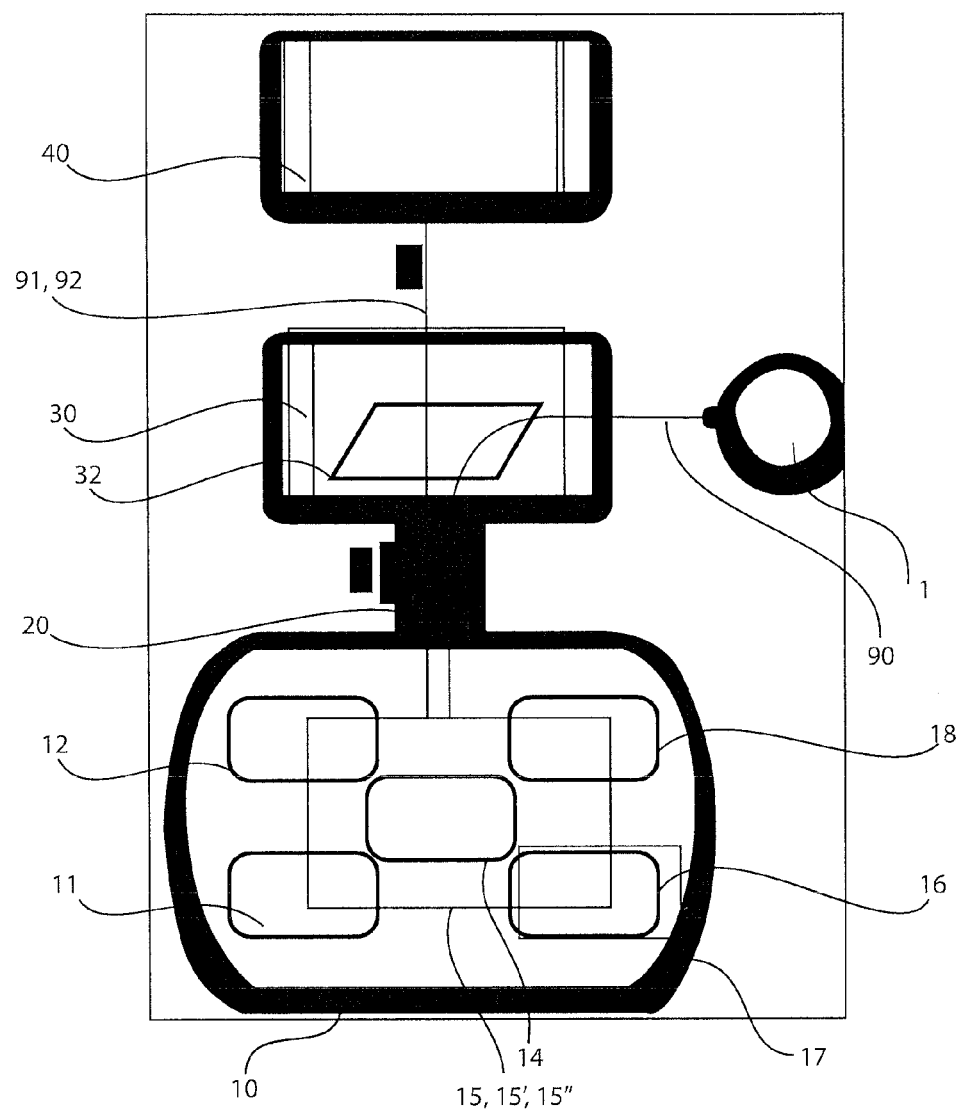
FIG. 2 is a schematic representation of a secure device coupled to a terminal and a server, for initiating a trustworthy connection to a server and subsequently receiving a document to be digitally signed, according to an embodiment of the invention.

FIG. 1 shows a flowchart illustrating an embodiment of the method. FIG. 2 is a schematic representation of a secure device coupled to a terminal and a server, for initiating a trustworthy connection to a server and subsequently receiving a document to be digitally signed, while FIG. 3 shows the secure device of FIG. 2, coupled to an external output device, for communicating contents of the document received.

Figure 3:
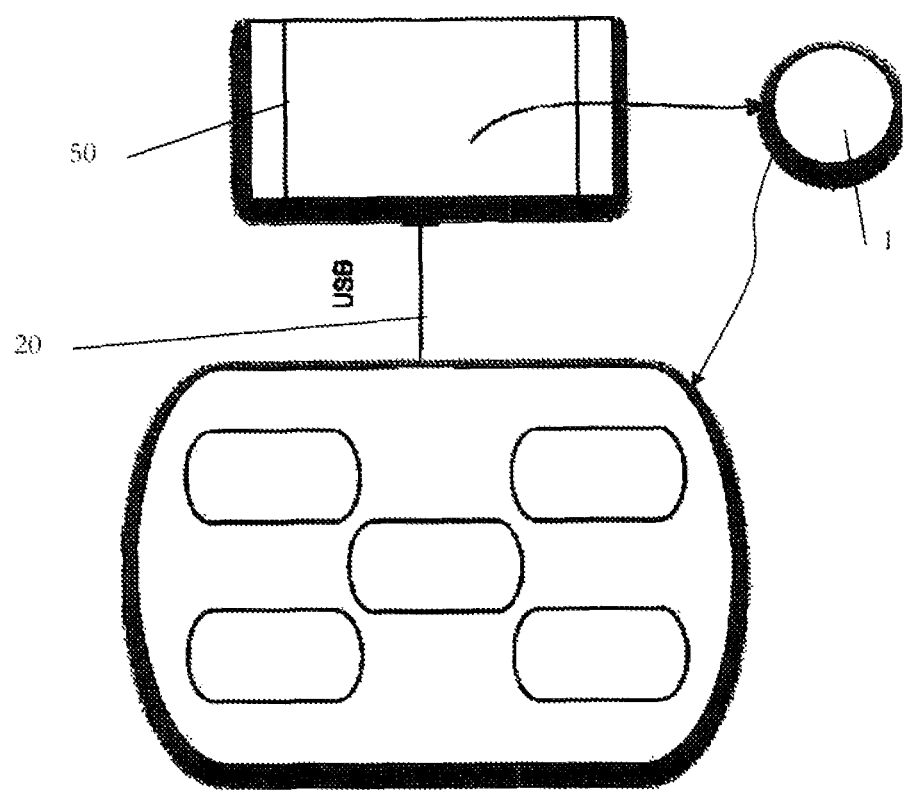
FIG. 3 is a schematic representation of the secure device of FIG. 2, coupled to an external device, for communicating contents of a received document thereto and allowing a user to verify said contents.

Therefore, in FIGS. 1-3 combined: first, the method uses first and foremost a secure device 10 (step S100), which is protected against malicious software or malware. In practice, the secure device has no client interfaces for software installation or other functions that can expose it to such a malware.

This device is furthermore configured to establish a connection, and preferably a secure connection such as a mutually authenticated connection, to a server and/or any suitable source or to a recipient 40, via a terminal 30. The terminal is for example a PC connected to a telecommunication network such as the Internet network. In this case, a suitable type of secure connection to a server is a TLS/SSL connection. The terminal can also be other sources such as a personal digital assistant or PDA. The secure device can in all cases be suitably connected to the terminal, such as to receive a document to be processed next.

The secure device is provided with a computerized method stored on its memory for executing steps of the method described hereinafter.

Specific aspects of this device are shown in FIG. 2. Typically, the secure device 10 has processing means (or computing means) 15 coupled to a memory, which includes both persistent and non-persistent memories 15' and 15". The persistent memory stores e.g., the computerized method evoked above, to be executed by the processing means.

In addition, the device is further provided with at least one interface 20, e.g., a USB interface, for communicating with the terminal, i.e. a PC 30 or other source. In embodiments, the same interface 20 (or another type of interface) can furthermore allow the secure device for communicating with an external device such as a beamer, a printer, or other output device 50.

If necessary, the secure device has a card reader 17 to read user credentials stored on a memory card 16, e.g., a smart card. Suitable use can safely be made out of such data, e.g., user credentials as stored on the card. In particular, a trustworthy connection can be established between a user (or strictly speaking the device) and a third party, e.g., a server, via the terminal and using such data. In a variant, the user credentials can be stored directly on the secure device.

Further, interfaces such as control buttons 18 and display 12, allow for interaction with a user 1.

The device 10 will first be connected (step S200) to a source such as to be able to subsequently receive a document. This source can be any type of terminal, such as a PDA. Preferably, the terminal is a host, e.g., a PC connectable to a server 40 through a telecommunication network (e.g., the Internet). The device 10 can then invoke a computerized method stored thereon to trigger a trustworthy connection to the server 40, step S300. For instance, it can establish a secure communication 91 with the server over a non-secure connection 92 via the terminal 30 (e.g., upon unlocking the card).

Authenticating the device to a server can be done while initiating the communication 91 over the non-secure connection 92, e.g., by initiating a SSL/TLS authentication to the server, using user credentials as stored on the card. In this regards, setting the device in communication with the server can advantageously include starting, from the device, a proxy client residing at the terminal, in order for the device to connect to the server, via the terminal (note that the proxy can possibly resides on the device too). The proxy relays bits received from the device to the internet and vice versa.

Authenticating the device to the server can be achieved, e.g., bi-directionally, by initiating from the device the SSL/TLS authentication to the server.

In this respect, the memory 15" can further have stored thereon a security software stack, including cryptographic algorithms, such as a TLS engine 14 for the SSL/TLS authentication. It can further store a USB management software (implementing a USB mass storage device or MSD profile 20), and possibly a pre-loaded networking proxy, as evoked above. User credentials can be stored on the memory card (e.g., a smart card 16), such as client-server certificates (e.g., X.509) enabling TLS-client authentication. The smart card can hold sensitive personal information and have encryption means. In variants, the card cannot encrypt but is used to sign sensitive operations. In still other variants, the card is used for both encryption and signing operations. The device is preferably equipped with a standard smart card reader 17. Additionally, the device has control buttons 18 selectors, e.g., OK and Cancel, and display 12, for displaying sensitive information.

Thus, in an embodiment, an SSL/TLS channel is set between the server and the device (step S300). Other type of trustworthy connection can be contemplated.

A document (i.e. to be digitally signed) can now be received at the secure device 10, e.g., through the mutually authenticated connection 91 established, as evoked above. In variants, the document is trivially obtained from any other suitable source, as known.

Upon reception, the device can access (step S400) contents of the document received. Accessing contents of a file in such a device as described here is known per se.

Next, the secure device can instruct to communicate the contents of the received document to an output device 12, 50 which differs from the terminal (i.e. a PC or any other insecure source), such that the contents can be subsequently verified by the user (step S500).

In an embodiment, the contents are displayed on a display 12 of the secure device 10. This is practical as long as the size of the document does not prevent it.

Preferably yet, the device is set in communication with an external output device 50. Then, contents of the document received can be communicated to this external device for subsequent verification. How to communicate such contents to an external device is generally known per se.

For example, the secure device can be configured to be connectable to a beamer (e.g., a display device with no "computing" capability, i.e., which can not be exposed to malware), using for instance secure Bluetooth pairing (SSP), to allow the document to be verified directly from the secure device.

As another example, the secure device can else be configured to be connectable to a printer, using a USB cable or secure Bluetooth paring (SSP). This allows the document to be printed directly from the secure device (the document can not be printed via the user's PC or other device in that case).

In all cases the user can verify the contents of the document without exposing the document to a device that is not secure. Thus the user knows that the text being read and the document stored securely on its secure device are identical.

Next, the user can issue a command to sign the document. This can for instance be carried out using directly the secure device's interface (e.g., scroll wheel and buttons) or through a command issued on a connected terminal, for example a PC. In all cases, the command is ascertained (step S600) on the secure device prior to being executed, step S700. If the command is inputted directly via the secure device's interface, then the command is ascertained by default and no additional step is required. If the command is inputted via a connected terminal, then the command can for example be ascertained by requiring user confirmation via the secure device's interface.

Next, the actual signature can be computed directly at the secure device. In an embodiment, this can be carried out by soliciting a smart card. Yet, there is no way for a malware to alter the contents of the document being signed at the secure device. Examples of signing operations for signing data are known in the art.

Finally the signed document can be sent to a client over a suitable connection 91 established via a host, e.g. via the established connection TLS connection to the server (when the server and the client are the same). In the case where the recipient differs from the server, i.e. if the document is destined to a different location than the server, it is possible to establish a second authenticated TLS connection (or more generally a second secure connection which differs from the connection to the source of the document first sent to the secure device).

The document does not have to originate from a secure source. For example the user can want to create the document on his/her PC and then sign and submit it. In such a case the document is created or retrieved (e.g., from the Internet) and then passed to and stored on the secure device. Furthermore, the document can simply be sent from any other sources.

Before issuing the digital signature, the user can use one of the techniques described above (beamer, printer or other output device) to verify that the document is as intended by the user. Clearly this document can have been modified by a malware prior to being stored securely on the secure device. Yet, once the user has verified the document contents, it can be processed as described above.

Different architectures allow implementation of the present invention.

1) In a first scenario, the secure device initially receives the document from a terminal, which differs from the host through which the signed document is finally sent to the recipient. Here the terminal can for example be a PC or a PDA. The document can for instance be preliminary downloaded at the terminal through an Internet query.

2) In a second scenario, the secure device initially receives the document from a server and via the host. The final recipient can be the same as the server, or not. There, two different connections can be required: a first one for initially receiving the document and a second one for sending the signed version. The two connections can even be one and a same if the final recipient is the server.

3) In a third scenario, the secure device initially receives the document from the host, i.e., a PC, but this, independently from the server evoked in the previous case. The host is then used to send the signed document to any suitable recipient.

Furthermore, aspects of the invention can be advantageously used to achieve a very simple, secure method for verification of a document by a user. In particular, such a method can include: connecting the secure device to a host and instructing at the secure device to establish a connection between the secure device and a server, via the host (e.g. a secure connection, a mutually authenticated connection such as a TLS/SSL connection, etc., as described hereinbefore); receiving the document through the established connection; accessing (at the secure device) the contents of the document received; and instructing at the secure device to communicate the accessed contents to an external output device (as described above), such that the contents can be verified by a user.

Computer program code required to implement at least parts of the above invention can be implemented in a high-level (e.g., procedural or object-oriented) programming language, or in assembly or machine language if desired; The language can be a compiled or interpreted language. Suitable processors include general and special purpose microprocessors. Note that instruction operations that the device, the terminal, the server or recipient performs can be stored on a computer program product tangibly embodied in a machine-readable storage device for execution by a programmable processor; and method steps of the invention can be performed by one or more programmable processors executing instructions to perform functions of the invention. In all case, the present invention can encompass not only the secure device but a system including this device, augmented with one or more of the following: a terminal, at least one server or any suitable source (plus a distinct recipient of the digitally signed document, if required), and an additional device such as a printer or a beamer, for communicating contents of the document to be signed for subsequent verification by the user.

More generally, the above invention can be implemented in digital electronic circuitry, or in computer hardware, firmware, software, or in combinations of them.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, flash memory devices or others.

While the present invention has been described with reference to certain embodiments, it will be understood by those skilled in the art that various changes can be made and equivalents can be substituted without departing from the scope of the present invention. In addition, many modifications can be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, the device can be configured such as to prevent connection to both the PC and an external device. It can further be provided with a battery or powered by an external device.

The invention claimed is:

1. A method for digitally signing a document, comprising steps of:
   providing a secure device, wherein the secure device is protected against malicious software or malware, free of client interfaces for software installation or other functions that could expose the secure device to malware, the secure device including a display and a memory card reader configured to read user credentials, and being adapted to establish a secure, mutually authenticated, connection to a recipient via a host, wherein the host is connected to a telecommunication network;
   after connection of the secure device to a terminal, using the terminal to access contents of a document received at the secure device;
   instructing at the secure device to communicate the accessed contents to an output device distinct from the terminal, wherein the accessed contents can be verified by a user;
   ascertaining at the secure device a command received from the terminal to digitally sign the document and executing at the secure device the ascertained command; and
   instructing at the secure device to send the digitally signed document to the recipient over the secure, mutually authenticated, connection established via the host, wherein the host is connected to a telecommunication network.

2. The method according to claim 1, wherein the terminal is the host, and wherein the method further comprises:
   after connecting to the host and prior to accessing the contents of the document received, instructing at the secure device to establish a connection between the secure device and a server, via the host; and
   receiving the document through the established connection.

3. The method according to claim 1, wherein a connection established via the host is a secure connection.

4. The method according to claim 1, wherein:
   at the step of ascertaining, the received command is a command inputted by the user at the secure device; and
   at the step of executing the ascertained command, the command executed is a command issued by the secure device and corresponding to the command inputted by the user.

5. The method according to claim 1, wherein at the step of ascertaining, the received command is a command received via the terminal to which the secure device is connected.

6. The method according to claim 2, wherein the recipient is the server and wherein at the step of instructing to send the digitally signed document, it is instructed to send the digitally signed document to the server, using the same connection already established with the server.

7. The method according to claim 1, wherein at the step of instructing to send the digitally signed document, the secure device is instructed to send the digitally signed document to a recipient distinct from a source of the document first received at the secure device.

8. The method according to claim 1, wherein the output device is a display of the secure device and the step of instructing to communicate the contents further comprises instructing to display the contents on the display of the secure device.

9. The method according to claim 1, wherein the output device is an external device, the method further comprising a step of establishing a communication between the secure device and the external device.

10. The method according to claim 9, wherein the step of instructing to communicate the contents comprises communicating the contents to the external device.

11. The method according to claim 9, wherein the external device is an output device with no computing capability.

12. The method according to claim 10, wherein the step of instructing to communicate the contents further comprises instructing to communicate the contents using secure Bluetooth pairing (SSP) or using a USB protocol.

13. The method according to claim 1, wherein at least one secure, mutually authenticated, connection established is a Transport Layer Security (TLS) connection.

14. The method according to claim 1, wherein the secure device is configured to connect directly to a printer and to print a document directly from the secure device.

15. A secure device for digitally signing a document, comprising:
   a memory and a plurality of interfaces;
   wherein the secure device is configured to interact with a user, a terminal, and a recipient;
   wherein the secure device is configured to establish a secure, mutually authenticated, connection with a recipient via a host when the secure device is connected to the host and the host is configured to communicate with the recipient through a telecommunication network;

wherein the secure device is protected against malicious software or malware, and is free of client interfaces for software installation or other functions that could expose the secure device to malware, the secure device including a display and a memory card reader configured to read user credentials; and wherein the secure device is configured to digitally sign the document upon receipt of a command from the terminal.

16. A secure device according to claim 15, further comprising: a personal computer; and a server.

17. The secure device according to claim 15, wherein the secure device is configured to connect directly to a printer and to print a document directly from the secure device.

18. A non-transitory computer readable article of manufacture tangibly embodying computer readable instructions which when executed causes a computer to carry out the steps of a method for digitally signing a document, comprising steps of:

providing a secure device, wherein the secure device is protected against malicious software or malware, free of client interfaces for software installation or other functions that could expose the secure device to malware, the secure device including a display and a memory card reader, and being adapted to establish a secure, mutually authenticated, connection to a recipient via a host, for example a personal computer or PC, wherein the host is connected to a telecommunication network;

after connection of the secure device to a terminal, using the terminal to access contents of a document received at the secure device;

instructing at the secure device to communicate the accessed contents to an output device distinct from the terminal, such that the accessed contents can be verified by a user;

ascertaining at the secure device a command received from the terminal to digitally sign the document and executing at the secure device the ascertained command; and instructing at the secure device to send the digitally signed document to the recipient over the secure, mutually authenticated, connection established via the host, wherein the host is connected to a telecommunication network.

19. The non-transitory computer readable article of manufacture according to claim 18, wherein the secure device is configured to connect directly to a printer and to print a document directly from the secure device.

\* \* \* \* \*